United States Patent
Hernandez Covarrubias

(10) Patent No.: US 8,371,634 B2
(45) Date of Patent: Feb. 12, 2013

(54) VEHICLE HINGE PILLAR AND FENDER INSULATOR

(75) Inventor: Alejandro Hernandez Covarrubias, Edo Mex CP (MX)

(73) Assignee: GM Global Technology Operations LLC, Detroit, MI (US)

( * ) Notice: Subject to any disclaimer, the term of this patent is extended or adjusted under 35 U.S.C. 154(b) by 157 days.

(21) Appl. No.: 12/953,237

(22) Filed: Nov. 23, 2010

(65) Prior Publication Data

US 2012/0126578 A1    May 24, 2012

(51) Int. Cl.
*B62D 25/04*    (2006.01)
*B60R 13/08*    (2006.01)

(52) U.S. Cl. .................... 296/39.3; 296/193.06; 296/198

(58) Field of Classification Search ............. 296/187.02, 296/193.06, 39.3, 193.05, 193.09, 203.02, 296/198

See application file for complete search history.

(56) References Cited

U.S. PATENT DOCUMENTS

| | | | |
|---|---|---|---|
| 6,062,624 A * | 5/2000 | Crabtree et al. | 296/39.3 |
| 6,146,565 A * | 11/2000 | Keller | 264/46.5 |
| 6,382,635 B1 * | 5/2002 | Fitzgerald | 277/630 |
| 6,413,611 B1 * | 7/2002 | Roberts et al. | 428/99 |
| 6,722,720 B2 * | 4/2004 | Donick et al. | 296/39.3 |
| 6,820,923 B1 * | 11/2004 | Bock | 296/187.02 |
| 6,880,883 B2 * | 4/2005 | Decker et al. | 296/203.02 |
| 6,955,845 B1 * | 10/2005 | Poole et al. | 428/76 |
| 7,428,774 B2 * | 9/2008 | Thomas et al. | 29/525.13 |
| 7,494,179 B2 * | 2/2009 | Deachin et al. | 296/187.02 |
| 7,597,382 B2 * | 10/2009 | Vilcek et al. | 296/187.02 |
| 7,621,373 B2 * | 11/2009 | Helferty | 181/268 |
| 7,913,814 B2 * | 3/2011 | Duffin et al. | 181/294 |
| 7,926,867 B2 * | 4/2011 | Kochert et al. | 296/187.02 |
| 7,967,372 B2 * | 6/2011 | Tomizawa et al. | 296/190.05 |
| 8,056,953 B2 * | 11/2011 | Kiskiras et al. | 296/39.3 |
| 8,079,442 B2 * | 12/2011 | Wojtowicki | 181/264 |
| 8,123,285 B2 * | 2/2012 | Lee et al. | 296/193.06 |
| 2012/0126578 A1 * | 5/2012 | Hernandez Covarrubias | 296/193.06 |

* cited by examiner

*Primary Examiner* — Glenn Dayoan
*Assistant Examiner* — Gregory Blankenship

(57) ABSTRACT

A motor vehicle has a hollow space between a front pillar and a fender. A noise insulator panel is mounted within and fills the hollow the hollow space between the pillar and the fender panel to block and absorb the communication of noise to the weather strip that seals the door to the pillar. The noise insulator panel includes a housing portion of compressible foam material with a base wall that is oversized to fit in compression between the pillar and the fender panel to block the communication of noise and a sidewall that extend forwardly from the base wall to define a cavity facing the engine and tires. An absorber portion fills the open cavity of the housing portion. The absorber portion is made of a fibrous material that is secured within the cavity of the housing portion and acts to absorb noise.

5 Claims, 1 Drawing Sheet

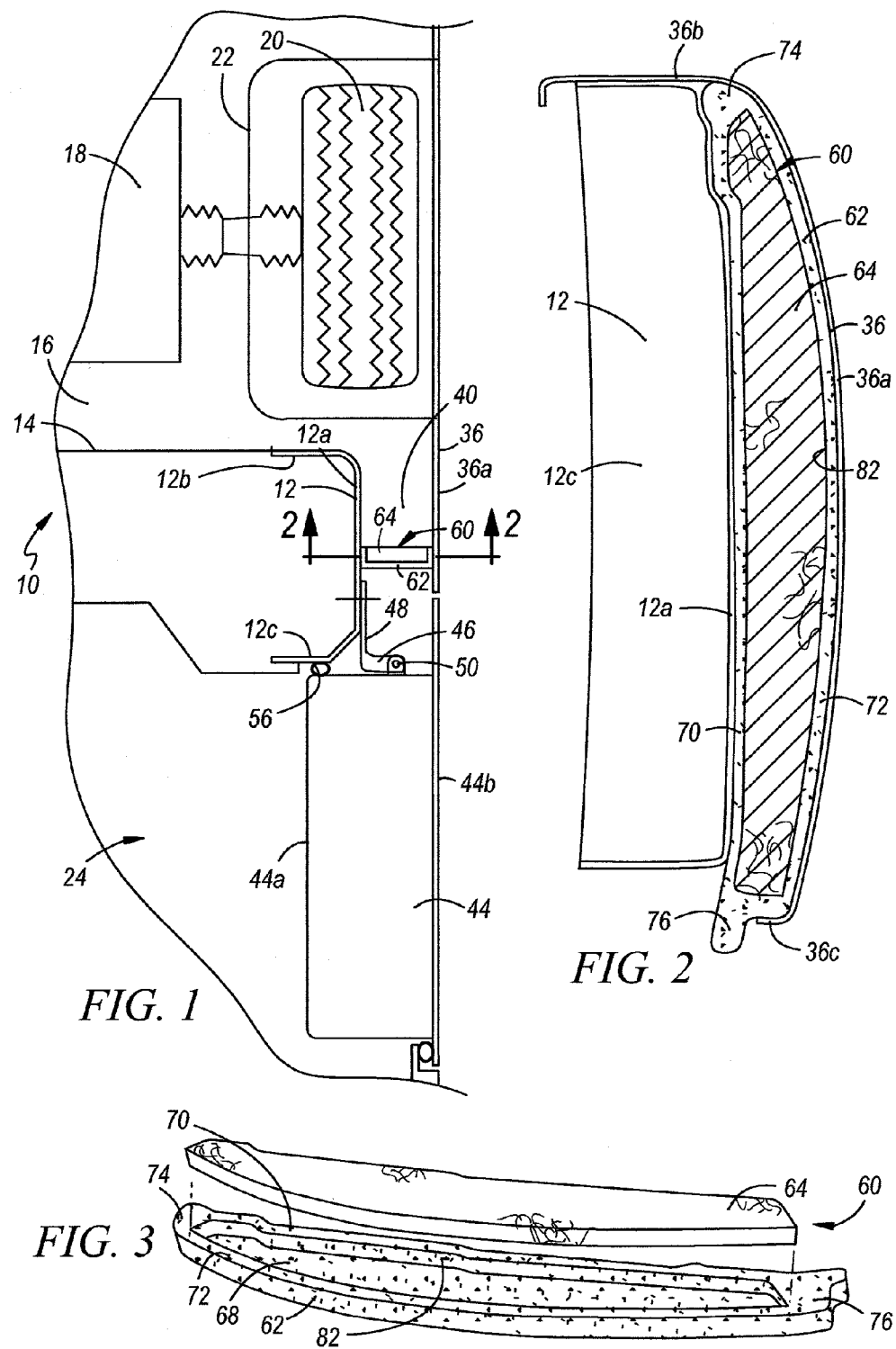

VEHICLE HINGE PILLAR AND FENDER INSULATOR

FIELD OF THE INVENTION

The present invention relates to reducing the noise in a vehicle passenger compartment and more particularly provides an insulator installed between the vehicle hinge pillar and the fender.

BACKGROUND OF THE INVENTION

It is known that the comfort of motor vehicle passengers is enhanced by reducing the noise level in the passenger compartment. The noise sources typically include road noise, engine noise, and wind noise. It is also known to provide a compressible weather strip mounted on the vehicle pillar and the other body panels that define the door opening. When the vehicle door is closed the door compresses the weather strip and the weather strip will serve to reduce noise intrusion into the passenger compartment, as well as sealing against water leaks.

SUMMARY OF THE INVENTION

A motor vehicle has a body structure having a front pillar and a vehicle door hingedly mounted on the pillar for swinging movement between open and closed positions. A weather strip is mounted on the pillar and engaged by the door when the door is in the closed position. A fender panel is mounted on the vehicle body structure forward of the vehicle door. The fender panel is spaced outwardly from the front pillar to define a hollow space, and the fender panel extends forward from the pillar and adjacent a vehicle engine and a vehicle tire so that engine noise and tire noise is communicated into the hollow space. A noise insulator panel is mounted within and fills the hollow space between the pillar and the fender panel to block and absorb the communication of noise to the weather strip. The noise insulator panel includes a housing portion of compressible foam material with a base wall that fits in compression between the pillar and the fender panel to block the communication of noise, and sidewalls that extend forwardly from the base wall to define a cavity facing forwardly toward the engine compartment. An absorber portion fills the open cavity of the housing portion. The absorber portion is made of a fibrous material that is secured within the cavity of the housing portion and acts to absorb noise.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings.

FIG. 1 is a plan view having parts broken away and in section showing an insulator panel installed between the door pillar and the front fender to reduce the noise communicated to the weather strip.

FIG. 2 is a section view taken in the direction of arrows 2-2 of FIG. 1, showing the installation of the insulator panel between the pillar and the fender.

FIG. 3 is an exploded perspective view showing the construction of the insulator panel

DETAILED DESCRIPTION OF THE EXEMPLARY EMBODIMENTS

The following description of certain exemplary embodiments is merely exemplary in nature and not intended to limit the invention, its application, or uses.

FIG. 1 is a plan view of a portion of a motor vehicle. The motor vehicle includes a body structure, generally indicated at 10, that includes a front pillar 12 and a bulkhead 14. The pillar 12 is generally C-shaped in cross section and includes an outer wall 12a, a front flange 12b, and a rear flange 12c.

An engine compartment 16 is located forward of the bulkhead 14 and houses an engine 18 and a front tire 20. The front tire 20 is housed within a tire housing 22. A passenger compartment 24 is located rearwardly of the bulkhead 14. A front fender 36 is suitably mounted on the vehicle body structure 10 and has sidewall 36a that is spaced somewhat outwardly from the pillar 12, thereby defining a hollow space 40 between the sidewall 36a of fender 36 and the outer wall 12a of pillar 12. As seen in FIG. 2, the fender 36 also has a top wall 36b that extends horizontally and a bottom wall 36c that turns inwardly.

A vehicle door 44 includes a door inner panel 44a and a door outer panel 44b. The vehicle door 44 is mounted on the pillar 12 by hinge assemblies, one of which is shown at hinge assembly 46. The hinge assembly 46 includes a first hinge link 48 that is welded or bolted to the pillar 12, and a second hinge link 50 that is welded or bolted to the door 44. A weather strip 56 is mounted on the rear flange 12c of the pillar 12 by a permanent adhesive. When the door is 44 is closed, as shown in FIG. 1, the weather strip 56 is compressed between the pillar rear flange 12c and the door inner panel 44a, thereby sealing the passenger compartment 24 against intrusion of water and noise. Road noise from the tire 20 and engine noise from the engine 18 are communicated through the hollow space 40 and ordinarily impinge upon the weather strip 56, so that the weather strip 56 provides the primary and sole obstacle to the communication of noise into the passenger compartment 24.

The present invention provides an insulator panel assembly 60 that will fill the hollow space 40 between the pillar 12 and fender 36, thereby blocking the transmission of engine noise to the weather strip 56. As shown in FIG. 3, the insulator panel assembly 60 includes a housing portion 62 and a sound absorber portion 64 that is carried within the housing portion 62. The housing portion 62 is made of a compressible foam material such as polyurethane or polyolefin. As best seen in FIG. 3, the housing portion 62 includes a base wall 68 having an inner sidewall 70 and an outer sidewall 72 that project from the base wall 68. In addition, a top wall 74 and a bottom wall 76 project from the base wall 68. As seen in FIG. 3, the base wall 68, the sidewalls 70 and 72, and the top and bottom walls 74 and 76, cooperate to define an open face cavity 82.

The absorber portion 64 is a fibrous sound absorbing material such as a nonwoven fiber. The absorber portion 64 is sheared or die cut from a larger piece of material to make a precise shape that will tightly fill the open face cavity 82 of the housing portion 62. The absorber portion 64 can be mounted within the housing portion 62 by friction, or an adhesive can be employed to assure that the fibrous material remains in position and does not become dislodged.

Referring again to FIGS. 2 and 3, it is seen that the insulator panel assembly 60 of FIG. 3 is installed by wedging the insulator panel assembly 60 into the hollow space 40 between the pillar 12 and fender 36. In particular, it will be appreciated that the edge of the base wall 68 and the inner sidewall 70 will be compressed tightly against the outer wall 12a of the pillar 12. Likewise, the base wall 68 and the outer sidewall 72 will be compressed tightly against the inside of the fender 36. As best seen in FIG. 2, the top wall 74 is preferably tightly engaged with the top wall 36b of the fender 36. The bottom wall 76 closes the bottom of the hollow space 40 and engages with the bottom wall 36c of the fender 36. Thus the insulator assembly 60 is also compressed tightly between the top wall 36b and the bottom wall 36c. The housing portion 62 is molded within a die so that the outside dimensions of the housing portion 62 can be closely controlled. The housing portion 62 is intentionally designed to be somewhat oversized in relation to the size of the hollow space 40 so that the insulator panel assembly 60 will be tightly compressed within the hollow space 40 between the pillar 12 and the fender 36 so as to be held reliably in place even during the extremes of vibration experienced by the motor vehicle during its use. Accordingly, no adhesive or other type of fastener is required to mount the insulator panel assembly 60 within the hollow space 40 between the pillar 12 and the fender 36.

Referring again to FIG. 1, noise emanating from the engine 18 and the tire 20 will enter the hollow space 40 and encounter the insulator panel assembly 60. The fibrous material of the absorber portion 64 will function to absorb the noise. Base wall 68 of the housing portion 62 acts as a barrier to reflect any noise that passes through the fibrous material of the absorber portion 64. Accordingly, the insulator panel assembly 60 will function as both a barrier and an absorber for preventing the communication of tire noise and engine noise into contact with the weather strip 56.

Thus, the invention provides new and improved noise prevention within the motor vehicle passenger compartment by providing a noise insulating panel that fills the space between the fender and the pillar, thereby reducing noise that reaches the weather strip that seals between the pillar and the door.

What is claimed is:

1. In motor vehicle the combination comprising:
   a vehicle body structure having a front pillar;
   a vehicle door hingedly mounted on the pillar for swinging movement between open and closed positions;
   a weather strip mounted on the pillar and engaged by the door when the door is in the closed position;
   a fender mounted on the vehicle body structure forward of the vehicle door, the fender being spaced outwardly from the front pillar to define a hollow space, and the fender extending forward from the pillar adjacent a vehicle engine and a vehicle tire so that engine noise and tire noise is communicated into the hollow space;
   and a noise insulator panel mounted within and filling the hollow space between the pillar and the fender so as to block and absorb the communication of noise to the weather strip;
   the noise insulator panel including:
      a housing portion of compressible foam material with a base wall that fits in compression between the pillar and the fender to block the communication of noise and a sidewall that extends forwardly from the base wall to define a cavity facing forwardly toward the engine and the tire, and
      an absorber portion that fills the cavity of the housing portion, said absorber portion being a fibrous material that is secured within the cavity of the housing portion and acts to absorb noise.

2. The combination of claim 1 further comprising both the base wall and the sidewalls of the housing portion being oversized in relation to the hollow space between the pillar and the fender to assure compressive engagement of the housing portion between the pillar and the fender.

3. The combination of claim 1 further comprising the fender having a top wall and a bottom wall, and the housing portion of the insulator panel having a top wall and a bottom wall respectively engaging with the top wall of the fender and the bottom wall of the fender.

4. The combination of claim 3 further comprising the housing portion being oversized in relation to the distance between the top wall and the bottom wall of the fender to assure compressive engagement of the housing portion with the top wall of the fender and bottom wall of the fender.

5. In motor vehicle the combination comprising:
   a vehicle body structure having a front pillar;
   a vehicle door hingedly mounted on the pillar for swinging movement between open and closed positions;
   a weather strip mounted on the pillar and engaged by the door when the door is in the closed position;
   a fender mounted on the vehicle body structure forward of the vehicle door, the fender being spaced outwardly from the pillar to define a hollow space, the fender having a top wall and a bottom wall defining the top and bottom of the hollow space between the pillar and the fender, the hollow space extending forward from the pillar and adjacent a vehicle engine and a vehicle tire so that engine noise and tire noise is communicated into the hollow space;
   and a noise insulator panel mounted within and filling the hollow him him space between the pillar and the fender so as to block and absorb the communication of noise to the weather strip;
   the noise insulator panel including:
      a housing portion of compressible foam material with a base wall that fits in compression between the pillar and the fender and a housing portion top wall and a housing portion bottom wall that fit in compression between the top wall of the fender and bottom wall of the fender so that the housing portion blocks the communication of noise, the housing portion also having a sidewall that extends forwardly from the base wall to define a cavity that faces forwardly toward the engine and the tire, and
      an absorber portion that fills the forwardly facing cavity of the housing portion, said absorber portion being a fibrous material that is secured within the cavity of the housing portion and acts to absorb noise.

* * * * *